(12) United States Patent
Cho et al.

(10) Patent No.: US 7,788,298 B2
(45) Date of Patent: Aug. 31, 2010

(54) METHOD AND MOBILE TERMINAL FOR EFFICIENT FILE LIST CREATION

(75) Inventors: Hyoung Rae Cho, Daegu (KR); Yong Su Kim, Gumi-si (KR); Jae Gon Son, Daegu (KR); Ki Tae Kim, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 381 days.

(21) Appl. No.: 12/031,325

(22) Filed: Feb. 14, 2008

(65) Prior Publication Data
US 2008/0208818 A1 Aug. 28, 2008

(30) Foreign Application Priority Data
Feb. 28, 2007 (KR) ...................... 10-2007-0020440

(51) Int. Cl.
*G06F 17/30* (2006.01)
(52) U.S. Cl. ...................... 707/805; 707/705; 707/770; 707/822
(58) Field of Classification Search ................ 707/705, 707/770, 804, 805, 822, 999.102
See application file for complete search history.

(56) References Cited

U.S. PATENT DOCUMENTS

| | | | | |
|---|---|---|---|---|
| 5,930,709 A | * | 7/1999 | Park et al. ................ | 455/435.1 |
| 6,052,735 A | * | 4/2000 | Ulrich et al. ................ | 709/236 |
| 6,697,795 B2 | * | 2/2004 | Holcomb ............................ | 1/1 |
| 7,111,015 B2 | * | 9/2006 | Aoyama ............................ | 1/1 |
| 7,567,904 B2 | * | 7/2009 | Layher ........................ | 704/270 |
| 7,606,358 B2 | * | 10/2009 | McGary et al. ......... | 379/218.01 |
| 2006/0212489 A1 | * | 9/2006 | Eggers ........................ | 707/201 |
| 2007/0207800 A1 | * | 9/2007 | Daley et al. ................. | 455/425 |
| 2008/0147667 A1 | * | 6/2008 | Hur et al. ........................ | 707/9 |
| 2008/0313558 A1 | * | 12/2008 | Karaoguz et al. ........... | 715/771 |

FOREIGN PATENT DOCUMENTS

KR 1020060078656 7/2006

* cited by examiner

*Primary Examiner*—Cheryl Lewis
(74) *Attorney, Agent, or Firm*—H.C. Park & Associates, PLC

(57) ABSTRACT

The present invention relates to a method and mobile terminal that enable efficient creation of a file list. The file list creation method includes selecting a directory having at least one file, setting a reference search location to the beginning of the selected directory, reading a directory entry at the reference search location, determining the state of a file corresponding to the directory entry, and creating a file list using the directory entry and updating the reference search location according to the size of the directory entry if the corresponding file is an existing file.

15 Claims, 3 Drawing Sheets

| FILE NAME | ATTRIBUTE | RESERVED | TIME | DATE | FIRST CLUSTER | LENGTH |
|---|---|---|---|---|---|---|
| 201 | 205 | 207 | 209 | 211 | 213 | 215 |

METHOD AND MOBILE TERMINAL FOR EFFICIENT FILE LIST CREATION

CROSS REFERENCE TO RELATED APPLICATION

This application claims priority from and the benefit of Korean Patent Application No. 10-2007-0020440, filed on Feb. 28, 2007, which is hereby incorporated by reference for all purposes as if fully set forth herein.

BACKGROUND OF THE INVENTION

1. Field of the Invention

The present invention relates generally to a mobile terminal and, more particularly, to a method and a mobile terminal that may enable efficient creation of a file list through direct use of directory entries.

2. Discussion of the Background

The user of an advanced mobile terminal having a high capacity storage unit can store a large number of files in a single folder or directory.

In general, a mobile terminal uses a file allocation table (FAT) file system to store various data in a storage unit. In a FAT file system, directory entries are maintained to record information regarding files in a directory or folder. For example, to provide a user with a list of files (such as still image files, moving image files, and MP3 music files) in a particular folder, directory entries associated with the folder are examined sequentially, starting with the first entry, to find names of files having desired attributes.

In a FAT file system, sequential searches of the directory entries are repeatedly performed for user requested operations such as the saving, deleting, copying, and listing of files. In particular, when a large number of files are stored in a single folder, repeated sequential searches may result in performance degradation of the mobile terminal.

SUMMARY OF THE INVENTION

The present invention provides a method and a mobile terminal that may enable efficient creation of a file list through direct use of directory entries.

Additional features of the invention will be set forth in the description which follows, and in part will be apparent from the description, or may be learned by practice of the invention.

The present invention discloses a file list creation method for a mobile terminal including selecting a directory having at least one file, setting a reference search location to the beginning of the selected directory, reading a directory entry at the reference search location, determining the state of a file corresponding to the directory entry, and creating a file list using the directory entry and updating the reference search location according to the size of the directory entry if the file is an existing file.

The present invention also discloses a mobile terminal for efficient file list creation including a memory unit to store directories and files, and a control unit. The control unit selects a directory having at least one file, sets a reference search location to the beginning of the selected directory, reads a directory entry at the reference search location, and creates a file list and updates the reference search location according to the size of the directory entry.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figures 1, 2:
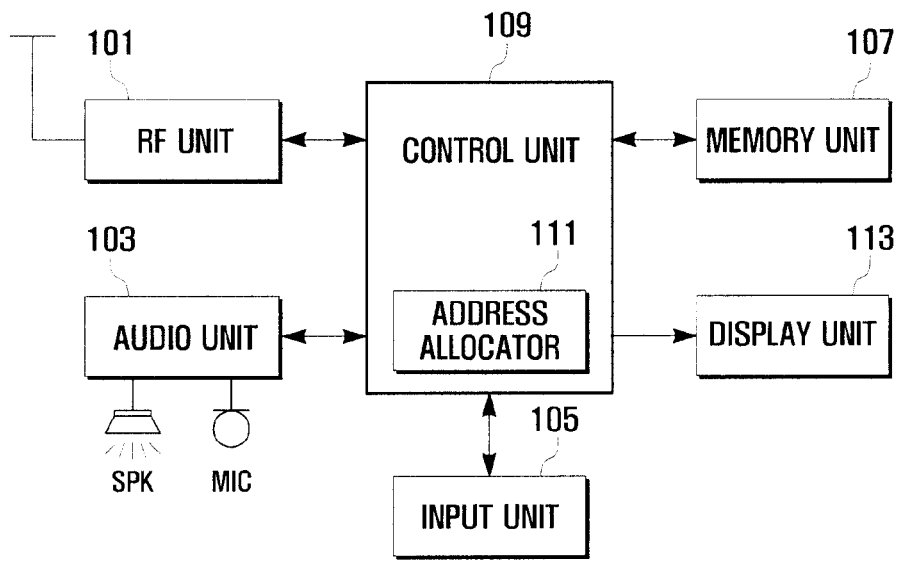
FIG. 1 shows a configuration of a mobile terminal according to an exemplary embodiment of the present invention.
FIG. 2 shows a format of a directory entry.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

In the description below, the mobile terminal may be any information and communication appliance or multimedia appliance, such as a mobile communication terminal, a mobile phone, a personal digital assistant (PDA), a smart phone, a notebook, a personal computer, or a desktop computer.

Although the description focuses on a FAT32 file system, the present invention is not limited to a FAT32 file system.

FIG. 1 shows a configuration of a mobile terminal according to an exemplary embodiment of the present invention.

Referring to FIG. 1, the mobile terminal includes a radio frequency (RF) unit 101, an audio unit 103, an input unit 105, a memory unit 107, a control unit 109 including an address allocator 111, and a display unit 113.

The RF unit 101 performs wireless communication operations for the mobile terminal. For example, the RF unit 101 may send and receive voice calls and text or multimedia messages through a mobile communication network.

The audio unit 103 converts an analog audio signal from a microphone MIC into a digital audio signal and sends the digital audio signal to the control unit 109. The audio unit 103 also converts a digital audio signal from the control unit 109 into an analog audio signal, and outputs the analog audio signal through a speaker SPK.

The input unit 105 may include any of a keypad, a touch screen, a touch pad, and a scroll wheel. The input unit 105 inputs a signal from the user to control the mobile terminal, and sends the input signal to the control unit 109.

The memory unit 107 stores programs, menus, and setting information for the operation and control of the mobile terminal.

In particular, the memory unit 107 stores file and directory information including directory entries, which maintain information on files and directories. For a file, the memory unit 107 may maintain a sector number indicating the starting sector in which the file is stored and an offset value (bytes) indicating a location in the sector. For a folder or directory, the memory unit 107 may maintain a sector number indicating the starting sector in which the folder is stored and an offset value (bytes) indicating a location in the sector.

The control unit 109 controls the overall operation of the mobile terminal. The control unit 109 may include a transmitting section to encode and modulate a signal to be transmitted through the RF unit 101 and a receiving section to demodulate and decode a signal received through the RF unit 101. The control unit 109 may include a modulator/demodulator (modem) and a coder/decoder (codec).

The control unit 109 also includes an address allocator 111, which maintains existing folders and files, creates new folders, and stores files in the new folders. A folder can contain files and subfolders.

When a folder is created, the address allocator 111 allocates a storage area for the folder in the memory unit 107. When a file is stored in the folder, the address allocator 111 allocates another storage area to store data of the file.

To create a file list of a selected folder, the control unit 109 sets a reference search location. That is, the reference search location may include a sector number indicating the starting sector in which the folder is stored and an offset value indicating a location in the sector.

The control unit 109 examines the 32-byte region from the reference search location to find a normal directory entry having information on an existing file. If a normal directory entry is found, the control unit 109 extracts a filename from the directory entry, and adds the extracted filename to the file list, and updates the reference search location by 32 bytes. This process is repeated until a directory entry having the end-of-entry marker is found.

The display unit 113 displays operation states, operation results, and various information of the mobile terminal, under the control of the control unit 109. The display unit 113 may include a liquid crystal display (LCD) panel or an organic light emitting diode (OLED) display panel. The display unit 113 displays a created file list under the control of the control unit 109.

FIG. 2 shows a format of a directory entry. A folder or directory may be composed of 32-byte directory entries corresponding to files belonging to the folder.

Referring to FIG. 2, a directory entry includes a file name field 201, an attribute field 205, a reserved field 207, a time field 209, a date field 211, a first cluster field 213, and a length field 215. The directory entry may include additional fields.

The file name field 201 may be 11 bytes and is used to store a filename of up to 8 bytes (short name) and an extension of up to 3 bytes.

The attribute field 205 may be 1 byte and is used to set file attributes such as 'read-only', 'hidden', 'system' 'volume-ID', 'directory', 'archive', and 'long name'.

The 'read-only' attribute indicates that the file may not be written to. The 'hidden' attribute indicates that the file is not shown in a regular directory listing. The 'system' attribute indicates that the file is an operating system file. The 'volume-ID' attribute indicates that the file is the root directory of a storage volume or partition. The 'directory' attribute indicates that the file is a directory (subfolder) containing other files. The 'archive' attribute supports backup utilities. The 'long name' attribute indicates that the file is actually a part of a long name entry for another file.

The reserved field 207 may be 1 byte and is reserved for future use.

The time field 209 may be 2 bytes and is used to record the time of the most recent update to the file.

The date field 211 may be 2 bytes and is used to record the date of the most recent update to the file.

The first cluster field 213 may be 4 bytes and is used to store a first cluster number indicating the physical address of the file stored in the memory unit 107. To process the file, the control unit 109 reads data addressed by the first cluster field 213.

The length field 215 may 4 bytes and is used to store the length or size of the file.

Figure 3:
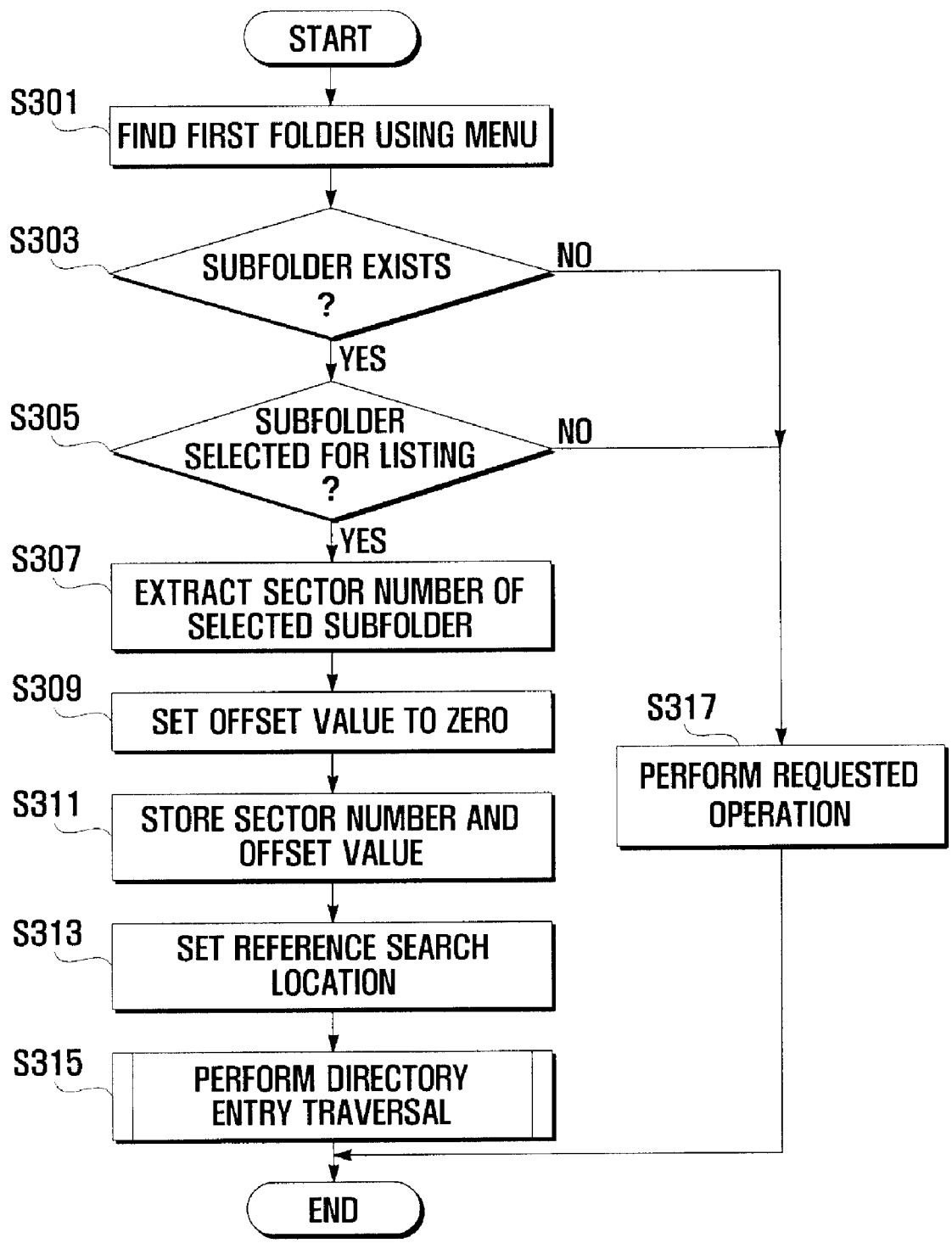
FIG. 3 is a flow chart showing a method of file list creation according to another exemplary embodiment of the present invention.

FIG. 3 is a flow chart showing a method of file list creation according to another exemplary embodiment of the present invention.

Referring to FIG. 1, FIG. 2, and FIG. 3, in response to the selection of a menu through the input unit 105, the control unit 109 of the mobile terminal finds a first folder associated with the selected menu (S301), and checks whether the first folder has at least one second folder (S303). That is, if a second folder exists within the first folder, the second folder is a subfolder of the first folder.

If the first folder does not include a second folder, the control unit 109 performs a requested operation (S317), such as folder creation.

If the first folder includes at least one second folder, the control unit 109 checks whether a second folder is selected by key input from the input unit 105 (S305).

If a second folder is not selected by key input, the control unit 109 performs a requested operation (S317), such as folder creation, folder deletion, or folder renaming.

If a second folder is selected by key input, the control unit 109 finds the selected second folder for file listing, extracts the sector number of the starting sector of the memory unit 107 at which the selected second folder is stored (S307), and sets an offset value to zero (S309).

The control unit 109 stores the extracted sector number and the offset value in the memory unit 107 (S311) and sets a reference search location for file listing using the sector number and offset value (S313).

After setting the reference search location, the control unit 109 performs directory entry traversal (S315), which is described in detail in connection with FIG. 4.

Figure 4:
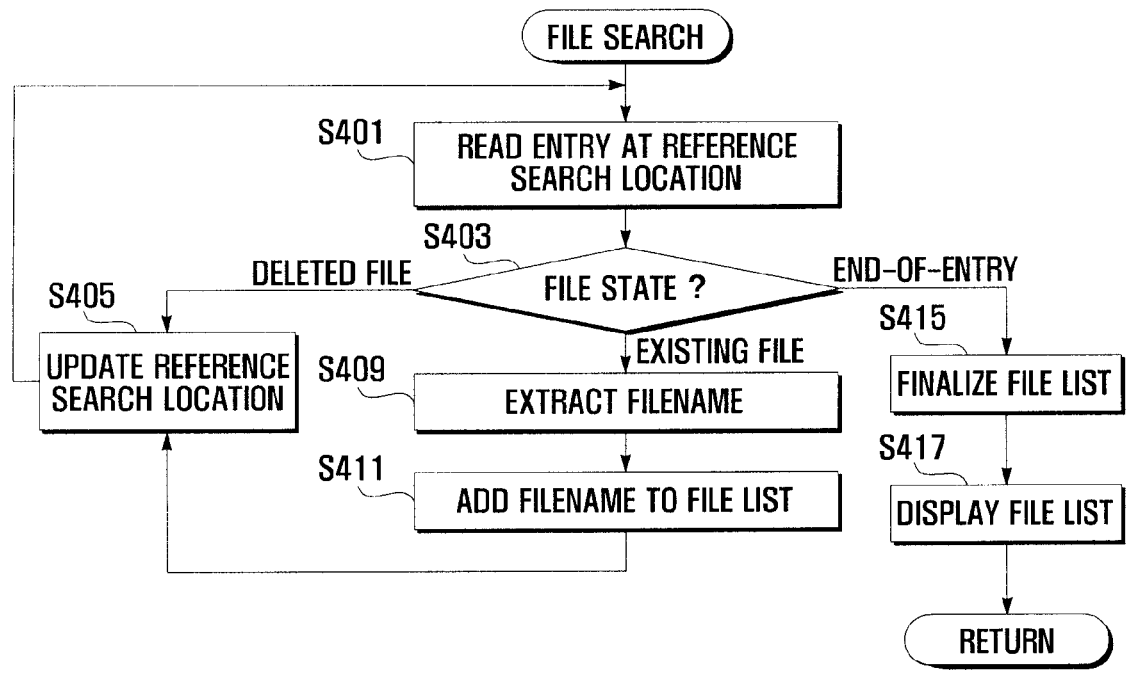
FIG. 4 is a flow chart showing a procedure of directory entry traversal for the method of FIG. 3.
Figure 5:
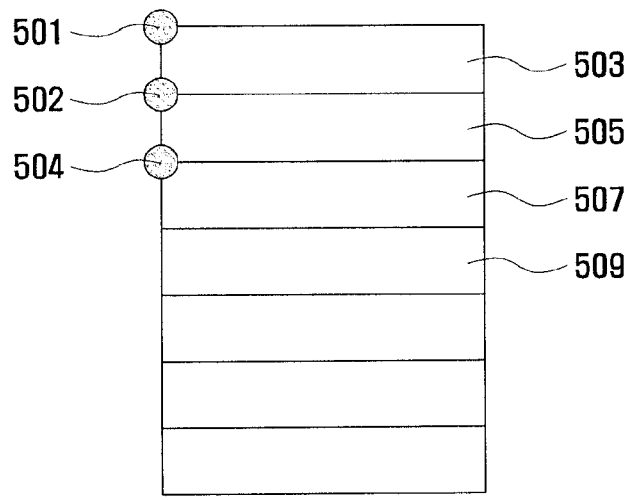
FIG. 5 shows steps of traversal of directory entries.

FIG. 4 is a flow chart showing a procedure of directory entry traversal for the method of FIG. 3. FIG. 5 shows the traversal of directory entries.

Referring to FIG. 1, FIG. 2, FIG. 3, FIG. 4, and FIG. 5, the control unit 109 reads a directory entry at the reference search location (S401). For example, in FIG. 5, the reference search location points to the beginning 501 of the first directory entry 503.

The control unit 109 examines the directory entry to identify the state of the associated file (S403). The state of a file can be identified using the first byte of the file name field 201 of the corresponding directory entry. That is, a first byte of '0xE5' indicates that the file is deleted (empty directory entry due to file deletion). A first byte of '0x00' indicates that the directory entry is empty and subsequent directory entries are also empty (namely, end-of-entry marker). A first byte of any other value indicates that a file exists If the directory entry indicates that a corresponding file has been deleted, the control unit 109 updates the reference search location according to the directory entry size (S405) and returns to step S401 to process the next directory entry. The directory entry size may be 32 bytes. For example, in FIG. 5, if the directory entry 503 indicates that the corresponding file is a deleted file, the directory entry 503 is skipped and the next directory entry 505 is examined.

If the directory entry indicates that the corresponding file is an existing file, the control unit 109 extracts a filename from the file name field 201 of the directory entry (S409), adds the extracted filename to the file list (S411), updates the reference search location by the directory entry size (S405), and returns to step S401 to process the next directory entry. For example, in FIG. 5, if the directory entry 503 indicates that the corresponding file is an existing file, a filename is extracted and added to the file list and the next directory entry 507 is examined.

If the directory entry has the end-of-entry marker, the control unit 109 finalizes the file list (S415) and displays the created file list through the display unit 113 (S417). For example, in FIG. 5, if the directory entry 507 has the end-of-entry marker, the file list is displayed and the procedure ends without processing of the next directory entry 509, which is empty.

For the purpose of description, directory entries are examined using the file name fields 201. However, other fields such as the attribute fields 205, time fields 209, date fields 211, and length fields 215 may also be used in the directory entry traversal to incorporate various search conditions.

As apparent from the above description, the present invention provides a method and mobile terminal that may enable efficient creation of a file list through direct use of directory entries. A file list can also be created according to various search conditions.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A file list creation method for a mobile terminal, comprising:
    selecting a directory having at least one file;
    setting a reference search location to the beginning of the selected directory;
    reading a directory entry at the reference search location;
    determining the state of a file corresponding to the directory entry; and
    creating a file list using the directory entry and updating the reference search location according to the size of the directory entry if the corresponding file is an existing file.

2. The file list creation method of claim 1, further comprising extracting a filename from the directory entry if the corresponding file is an existing file.

3. The file list creation method of claim 2, further comprising updating the reference search location according to the size of the directory entry if the corresponding file is a deleted file.

4. The file list creation method of claim 3, further comprising displaying the file list if the directory entry is an end-of-entry marker.

5. The file list creation method of claim 4, wherein the size of the directory entry is 32 bytes.

6. The file list creation method of claim 1, wherein setting a reference search location comprises setting the reference search location to a sector number of a starting sector of the selected directory.

7. The file list creation method of claim 6, wherein setting a reference search location further comprises setting an offset value for the selected directory to zero.

8. A mobile terminal for efficient file list creation, comprising:
    a memory unit to store directories and files; and
    a control unit to select a directory having at least one file, set a reference search location to the beginning of the selected directory, read a directory entry at the reference search location, and create a file list and update the reference search location according to the size of the directory entry.

9. The mobile terminal of claim 8, wherein the control unit examines the directory entry to determine the state of a corresponding file.

10. The mobile terminal of claim 9, wherein the control unit extracts a filename from the directory entry and creates the file list using the extracted filename if the corresponding file is an existing file.

11. The mobile terminal of claim 10, wherein the control unit updates the reference search location according to the size of the directory entry if the corresponding file is a deleted file.

12. The mobile terminal of claim 11, wherein the control unit controls a display unit to display the file list if the directory entry is an end-of-entry marker.

13. The mobile terminal of claim 12, wherein the size of the directory entry is 32 bytes.

14. The mobile terminal of claim 8, wherein the control unit initially sets the reference search location to a sector number of a starting sector of the selected directory.

15. The mobile terminal of claim 14, wherein the control unit sets an offset value for the selected directory to zero

\* \* \* \* \*